United States Patent [19]
Yamamoto et al.

[11] Patent Number: 4,639,735
[45] Date of Patent: Jan. 27, 1987

[54] APPARATUS FOR DRIVING LIQUID JET HEAD

[75] Inventors: Mitsuru Yamamoto, Yokohama; Kunio Watanabe, Kawasaki; Junji Shimoda, Sagamihara, all of Japan

[73] Assignee: Canon Kabushiki Kaisha, Tokyo, Japan

[21] Appl. No.: 616,703

[22] Filed: Jun. 4, 1984

[30] Foreign Application Priority Data

Jun. 14, 1983 [JP] Japan ................................ 58-106436

[51] Int. Cl.[4] ............................................ G01D 15/16
[52] U.S. Cl. ................................ 346/1.1; 346/140 R; 310/317; 310/326
[58] Field of Search .................... 346/75, 140 PD, 1.1; 400/126; 310/317, 326

[56] References Cited

U.S. PATENT DOCUMENTS 4,161,670 7/1979 Kern ............................ 346/140 PD
4,393,384 7/1983 Kyser .......................... 346/140 PD
4,471,363 9/1984 Hanaoka ..................... 346/140 PD

*Primary Examiner*—E. A. Goldberg
*Assistant Examiner*—Mark Reinhart
*Attorney, Agent, or Firm*—Fitzpatrick, Cella, Harper & Scinto

[57] ABSTRACT

An apparatus for driving a liquid jet head comprises: a piezoelectric element which mechanically deforms responsive to an electric signal; a pressure chamber whose volume varies due to the deformation of such element; a discharge port communicated with such chamber; 1st and 2nd charging circuits to charge such element at the same polarity; a discharging circuit to discharge such element; and a control unit for making the 1st charging circuit operative prior to the operation of the 2nd charging circuit. A charge time constant of the 1st charging circuit is set to be sufficiently long that no droplet is emitted. A charge time constant of the 2nd charging circuit is set to be shorter to emit a droplet from the discharge port. The surface tension of the meniscus and the contractive force due to the contraction of the pressure chamber act multiplicatively, so that it is possible to record a droplet of a small dot diameter.

2 Claims, 6 Drawing Figures

APPARATUS FOR DRIVING LIQUID JET HEAD

BACKGROUND OF THE INVENTION

1. Field of the Invention

The present invention relates to an apparatus for driving a liquid jet head such as an ink jet head and, more particularly, to an apparatus for driving a liquid jet head which discharges a liquid droplet for recording.

2. Description of the Prior Art

As means for discharging a recording liquid by driving a liquid jet head, there has been conventionally adopted a method whereby an outer wall of a pressure chamber in the jet head is surrounded by electrical/mechanical transducing means, e.g., by a piezoelectric transducer elements and a voltage pulse in the polarization direction is applied to this piezoelectric element for causing the volume of the pressure chamber to be rapidly reduced, thereby discharging a recording liquid droplet. The diameter of a lot of the recording liquid droplet on a recording medium is controlled by changing the value of the applied voltage pulse.

However, in such conventional driving apparatus, the range of dot diameters provided by the droplets is narrow and a particularly small dot diameter cannot be obtained, so that half-tone expression is impossible which makes such a conventional method unsuitable for high quality recording.

SUMMARY OF THE INVENTION

It is an object of the present invention to eliminate the above-mentioned drawback in the conventional apparatus and to provide an apparatus for driving a liquid jet head in which a variable range of a dot diameter of a recording liquid droplet can be extended more than in conventional apparatus.

It is a further object of the invention to provide an apparatus for driving liquid jet head which can realize a smaller dot diameter than is possible with conventional apparatus.

The above and other objects, features and advantages of the present invention will become apparent from the following detailed description with reference to the accompanying drawings.

Figure 1:
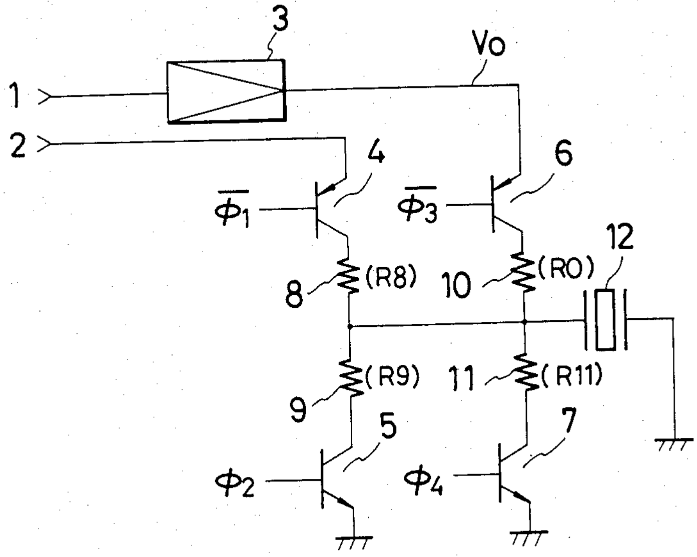
FIG. 1 is a circuit diagram showing a practical example of an apparatus for driving a liquid jet head according to the present invention.

DETAILED DESCRIPTION OF THE PREFERRED EMBODIMENT (Constitution of an apparatus for driving a liquid jet head according to the present embodiment) (FIG. 1)

Figure 3:
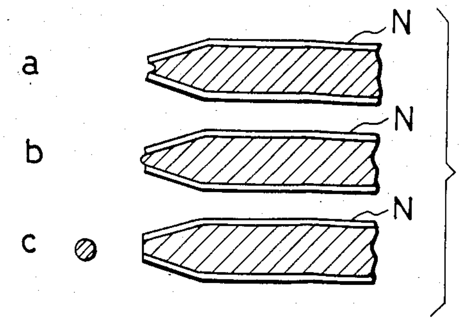
FIG. 3 is an explanatory diagram showing the motion of a meniscus which is made operative by the apparatus of FIG. 1 and the discharge state of the recording liquid droplet.

FIG. 1 is a circuit diagram showing an example of the liquid jet head driving apparatus according to the present invention. In the diagram, a reference numeral 1 denotes a signal indicative of a quantity of a recording liquid, e.g., an ink which is discharged, namely, a gradient signal; and 2 represents a positive voltage power source to move back the location of a meniscus (or edge portion of the recording liquid). The magnitude of the gradient signal 1 can be controlled by well-known means. An amplifier 3 amplifies the gradient signal 1 and applies it to a piezoelectric element 12 through a switching element which will be described later. The piezoelectric element 12 is formed in a manner such that it is closely attached to a nozzle tube (indicated at N in FIG. 3) of a liquid jet head, more particularly, to an outer wall of a pressure chamber thereof, thereby surrounding the pressure chamber. The movement of the location of the meniscus in the nozzle tube and the discharge of the recording liquid are controlled due to the expansion and contraction of the piezoelectric element 12.

Switching elements 4 to 7 control the timing of the voltage which is applied to the piezoelectric element 12. The elements 4 and 6 among these switching elements consist of, e.g., pnp switching transistors, while the elements 5 and 7 consist of, e.g., npn switching transistors. As shown in FIG. 1, timing pulses $\overline{\phi_1}$, $\phi_2$, $\overline{\phi_3}$ and $\phi_4$ are respectively input to the bases of these transistors. The timing pulses $\overline{\phi_1}$ and $\overline{\phi_3}$ are the pulses of which $\phi_1$ and $\phi_3$ in FIG. 2 were inverted respectively. Likewise, the pulses $\phi_2$ and $\phi_4$ are the pulses indicated by $\phi_2$ and $\phi_4$ in FIG. 2, respectively. The emitter of the transistor 4 is connected to the positive voltage power source 2 and the emitter of the transistor 6 is connected to an output of the amplifier 3. The collectors of those transistors are connected to resistors 8 and 10, respectively. The other ends of the resistors 8 and 10 are together connected to a positive electrode of the piezoelectric element 12. The positive electrode of the piezoelectric element is further connected through a resistor 9 to the collector of the transistor 5 and through a resistor 11 to the collector of the transistor 7. The emitters of the transistors 5 and 7 and a negative electrode of the piezoelectric element 12 are held at a reference potential, e.g., at a ground potential. In addition, the resistors 8 and 11 may be variable resistors.

(Operation of the apparatus for driving a liquid jet head in the present embodiment) (FIGS. 1 to 5)

Figure 2:
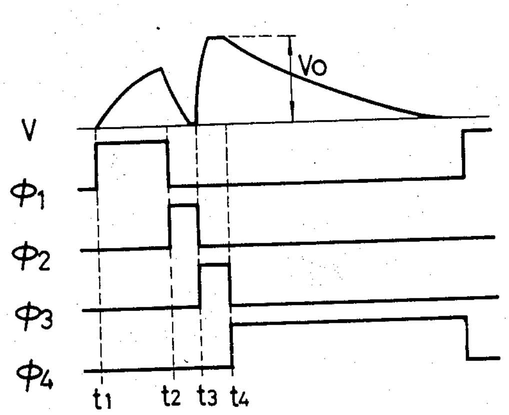
FIG. 2 is an explanatory diagram showing operation timing of the apparatus of FIG. 1.

The operation of the driving apparatus of FIG. 1 will be described with reference to FIGS. 2 to 5. A driving voltage of V in FIG. 2 is applied to the piezoelectric element 12 as will be explained in detail later.

(1) The switching element 4 is turned on in response to the timing pulse $\overline{\phi_1}$ at time $t_1$ (FIG. 2), so that the piezoelectric element 12 is charged through the resistor 8 in its polarization direction by the positive voltage power source 2. In this case, if a resistance value of the resistor 8 is set into an enough large value, the piezoelectric element 12 will slowly contract, so that no recording liquid will be discharged.

(2) Subsequently, when the switching element 4 is turned off at time $t_2$ and the switching element 5 is turned on in response to the timing pulse $\phi_2$, the charges accumulated in the piezoelectric element 12 are discharged through the resistor 9 and switching element 5. In this case, if a resistance value of the resistor 9 is set into an enough small value, the piezoelectric element 12 will rapidly expand from its contracted state. Due to this, as shown in FIG. 3*a*, the meniscus in the nozzle tube N is moved back. This backward meniscus starts having forward due to the surface tension after the time elapse of approx. 10 μsec.

(3) The switching element 5 is turned off at time $t_3$ when the meniscus has been moved ahead as shown in FIG. 3*b* and the switching element 6 is turned on in response to the timing pulse $\phi_3$. Thus, the piezoelectric element 12 is charged through the resistor 10 in response to the gradient signal 1 amplified by the amplifier 3. In this case, if a resistance value of the resistor 10 is set into an enough small value, the piezoelectric element 12 will be rapidly charged and will rapidly contract in its radius direction. The volume in the nozzle tube N is reduced due to this contraction, so that the recording liquid droplet is discharged as shown in FIG. 3*c*.

In this discharge of the recording liquid, since the above-mentioned motion of the meniscus due to the surface tension and the movement of the recording liquid due to the contraction of the piezoelectric element 12 are added, the discharge is made possible even with such a small contraction amount of the piezoelectric element 12 that could not otherwise discharge droplet. Consequently, it is possible to discharge a recording liquid droplet having a small dot diameter.

Figure 4:
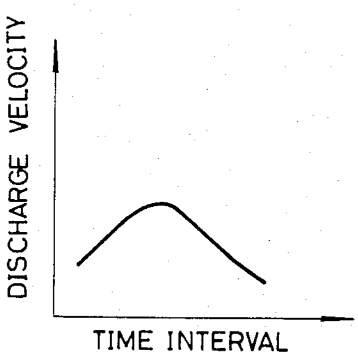
FIG. 4 is a graph showing the relation between the discharge velocity of the recording liquid which is emitted by the apparatus of FIG. 1 and the time interval between $t_2$ and $t_3$ in FIG. 2.

As described above, to discharge the recording liquid with the driving apparatus of FIG. 1, the time interval between the times $t_2$ and $t_3$ is set so that the surface tension of the meniscus and the contractive force due to the contraction of the piezoelectric element 12 act multiplicatively. FIG. 4 shows the relation between this time interval and the discharge velocity. Namely, the above time interval is set so that the discharge velocity becomes maximum.

(4) Subsequently, when the switching element 6 is turned off at time $t_4$ and the switching element 7 is turned on in response to the timing pulse $\phi_4$, the charges of the piezoelectric element 12 are discharged through the resistor 11 and switching element 7. In this case, a discharge time constant is set to be sufficiently long to prevent the introduction of air into the nozzle tube N as a result of a rapid backward movement of the meniscus due to a rapid discharge of the piezoelectric element 12.

Now, assuming that a charge time constant in case of (1) is $\tau_1$, a discharge time constant in (2) is $\tau_2$, a charge time constant in (3) is $\tau_3$, and a discharge time constant in (4) is $\tau_4$, they are set into $\tau_4 > \tau_1 > \tau_2 > \tau_3$ as is obvious from FIG. 2 and, in particular, $\tau_1$ is set to be enough longer than $\tau_3$, thereby preventing the liquid droplet from being discharged in (1). Therefore, resistance values R8, R9, R10 and R11 of the resistors 8, 9, 10 and 11 are also set as follows.

R11>R8>R9>R10

Figure 5:
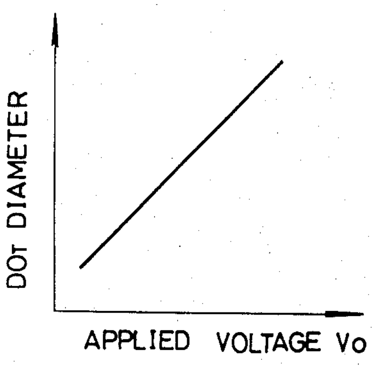
FIG. 5 is a graph showing the relation between the dot diameter which is recorded by the operation of the apparatus of FIG. 1 and the voltage $V_0$ applied to the piezoelectric transducer element in FIG. 1.

By controlling the switching elements 4 to 7 in this way, the voltage waveform shown by V in FIG. 2 is applied to the piezoelectric element 12. Further, by controlling a magnitude of the gradient signal 1 and changing a positive pulse voltage value $V_0$ in FIG. 2, a quantity of recording liquid which is discharged can be controlled, thereby enabling a dot diameter which is formed on a recording medium by the recording liquid droplet to be varied. According to the apparatus of FIG. 1, as already mentioned above, the recording liquid can be discharged by a small contractive amount of the piezoelectric element 12; therefore, a smaller dot diameter than is possible using the conventional apparatus can be achieved. In addition, the apparatus of the present invention as constituted in the manner such that after the meniscus was moved back by applying the driving voltage of the positive voltage power source 2, the recording liquid droplet is discharged by applying the gradient signal 1 and a quantity of recording liquid which is discharged is controlled by changing its voltage value. Thus, a variable range of a dot diameter of the recording liquid droplet can be extended than that by the conventional apparatus. FIG. 5 shows the relation between the positive voltage value $V_0$ (FIG. 2) which is applied to the piezoelectric element 12 and the dot diameter after recording or printing.

On the other hand, although only the gradient signal 1 is variable in the apparatus of FIG. 1, only the positive voltage 2 may be varied. However, if the positive voltage 2 is set to be large, the meniscus will rapidly move back, so that the air will be mixed into the recording liquid and the air bubbles are generated, resulting in deterioration in recording quality. Therefore, even in case of variably controlling the voltage of the positive voltage power source 2, it is desirable also to use a variable control of the gradient signal 1. Particularly, the constitution such that only the gradient signal 1 is made variable is advantageous for simplification of the circuit arrangement.

As described above, according to the apparatus of FIG. 1, since the driving voltage applied to the piezoelectric element 12 is always set into a single direction (for example, the driving voltage in the positive direction shown by V in FIG. 2), the construction of the driving voltage applying circuit for the piezoelectric element 12 and its control circuit are simplified, allowing the reliable operation to be provided. Furthermore, another configuration is also possible whereby a single driving voltage is applied to the piezoelectric element 12 to expand the piezoelectric element 12 in response to, e.g., its trailing edge, and then the piezoelectric element 12 is contracted from the expanded state to the state in that no voltage is applied for allowing the recording liquid to be discharged, and a dot diameter is changed by controlling a magnitude of the trailing voltage. However in this case, a too-large trailing value will result in breakage of the polarization characteristic of the piezoelectric element 12. On the contrary, according to the apparatus of FIG. 1, the leading time constant of the first positive voltage pulse is set to be large so as not to discharge the recording liquid; the trailing time constant is set to be small to move back the meniscus; the recording liquid is discharged in response to the second positive voltage pulse; a magnitude of the second positive voltage pulse is controlled; and the time interval when the first and second positive voltage pulses are applied to the piezoelectric element 12 is set so that the discharge velocity of the recording liquid droplet becomes maximum. Therefore, a dot diameter can be changed without any fear of breakage of the polarization characteristics of the piezoelectric element 12 and it is also possible to record a smaller dot diameter than is possible using conventional apparatus.

Figure 6:
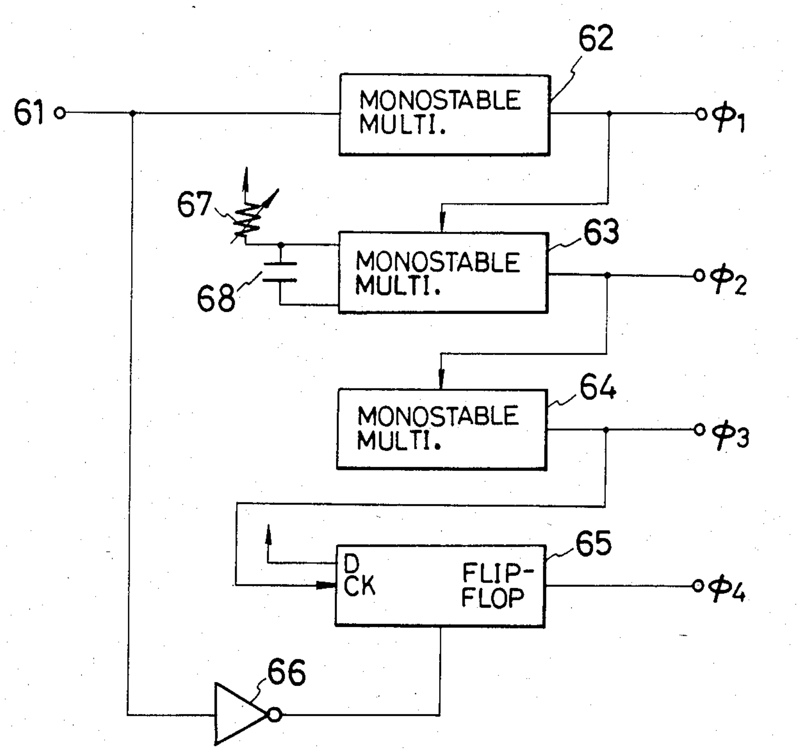
FIG. 6 is a block diagram showing a control unit for the apparatus of FIG. 1.

(Practical example of a control unit for the driving apparatus of FIG. 1) (FIG. 6)

FIG. 6 shows an example of a arrangement to obtain the timing pulses shown by $\phi_1$ to $\phi_4$ in FIG. 2. In FIG. 6, a reference numeral 61 denotes an input trigger signal; 62 to 64 are monostable multivibrators; 65 a D flip flop; 66 is an inverter; 67 is a variable resistor; and 68 is a capacitor.

In the arrangement shown, the $\phi_1$ signal is output from the monostable multivibrator 62 in response to the leading edge of the trigger signal 61. The $\phi_2$ signal is output from the monostable multivibrator 63 in response to the trailing edge of this output signal $\phi_1$. A pulse width of this output signal $\phi_2$ is adjustable through the variable resistor 67 which is externally equipped and the above-mentioned time interval $(t_2-t_3)$ is adjusted so that the discharge velocity becomes maximum. The $\phi_3$ signal is output from the monostable multivibrator 64 in response to the trailing edge of the output signal $\phi_2$. The D flip flop 65 is set in response to the output signal $\phi_3$ and is reset in response to the signal in which the next trigger signal 61 was inverted by the inverter 66. The $\phi_4$ signal is output from the D flip flop 65.

As described in detail above, according to the present invention, a first electric signal is supplied to the electrical/mechanical transducing means and a second electric signal will be supplied thereto in a predetermined time interval, and means for controlling a magnitude of the second electric signal is provided. Therefore, the forward movement due to the surface tension of the meniscus which was moved back in response to the first electric signal and the motion of the recording liquid in association with the deformation of the electrical/mechanical transducing means in response to the second electric signal are added. Thus, the recording liquid can be discharged by a small deformation of the electrical/mechanical transducing means that could not discharge a droplet. Therefore, it is possible to record a small dot diameter. Further, after moving back the meniscus in response to the first electric signal, the recording liquid droplet is discharged in response to the second electric signal and a magnitude of the second electric signal is also controlled. Therefore, a variable range of a dot diameter of the recording liquid droplet can be extended more than is possible with the conventional apparatus.

Also, in the present embodiment, although an example whereby the piezoelectric element used was an electric/mechanical transducing means, an electrostriction element, a magnetostriction element and the like may be also used. Namely, any elements which can transduce an electric signal to the mechanical deformation may be used.

In addition, the foregoing practical examples do not restrict the scope of the present invention. Various changes and modifications will be apparent to a person skilled in the art to which the invention pertains and all such changes and modifications are deemed to lie within the spirit and scope of the invention, which is defined solely by the appended claims.

What we claim is:

1. A method of ejecting a droplet of a liquid from a discharge port in communication with a liquid chamber, comprising the steps of:
   - reducing the volume of said liquid chamber without ejecting a droplet of liquid from said discharge port;
   - suddenly increasing the volume of said liquid chamber to retract a meniscus of the liquid from said discharge port;
   - suddenly reducing the volume of said liquid chamber, substantially immediately after said sudden increase in volume and in substantial synchronism with the maximum velocity of the natural recovery of the meniscus toward said discharge port, to eject liquid from said discharge port; and
   - increasing the volume of said liquid chamber to an original condition.

2. The method according to claim 1, further comprising controlling the volume to which said liquid chamber is reduced in said sudden volume reducing step.

* * * * *